UNITED STATES PATENT OFFICE.

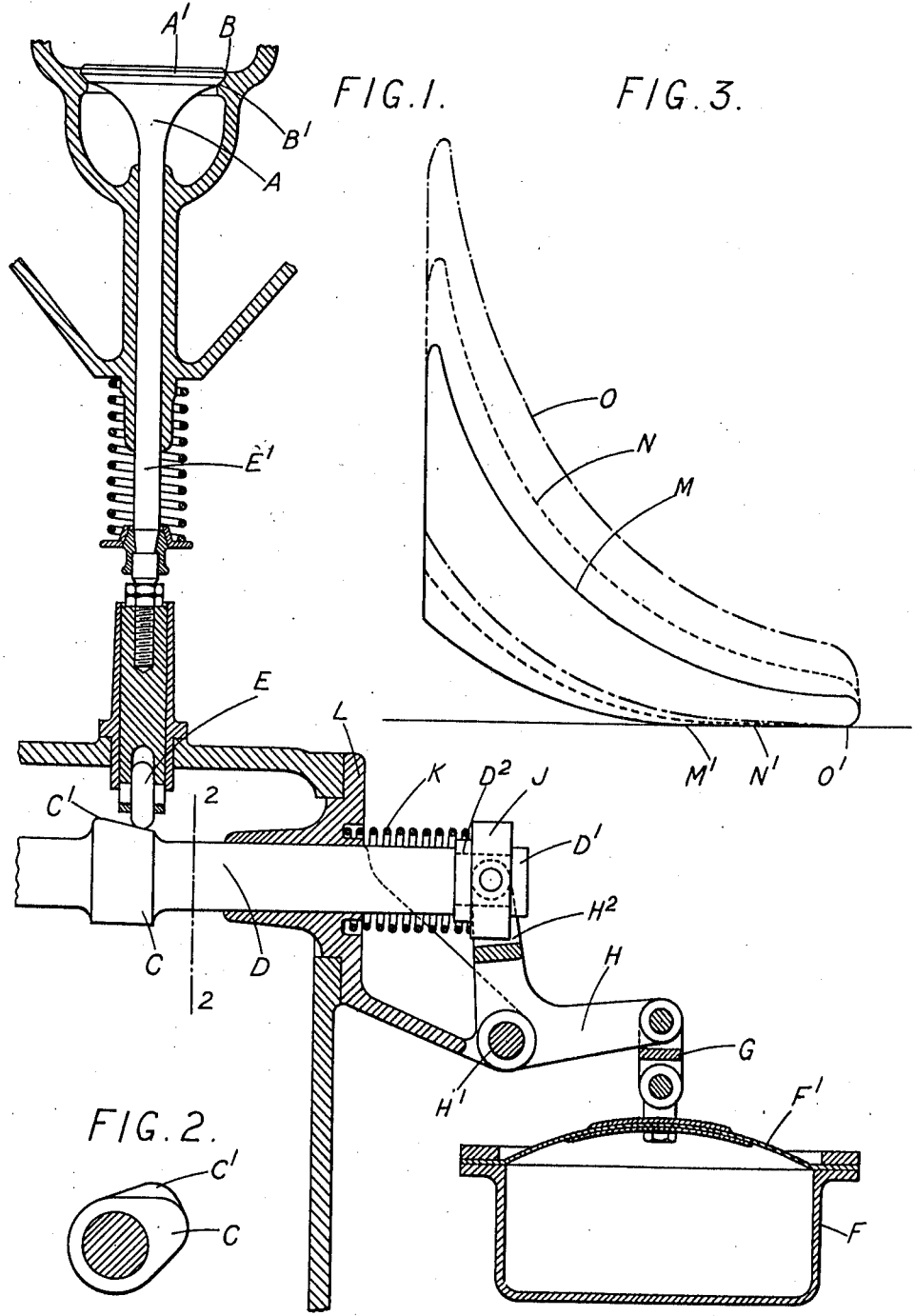

HARRY RALPH RICARDO, OF LONDON, ENGLAND.

REGULATING MEANS FOR INTERNAL-COMBUSTION ENGINES.

1,316,977. Specification of Letters Patent. Patented Sept. 23, 1919.

Application filed April 1, 1918. Serial No. 226,130.

*To all whom it may concern:*

Be it known that I, HARRY RALPH RICARDO, subject of the King of England, residing at London, in England, have invented certain new and useful Improvements in Regulating Means for Internal-Combustion Engines, of which the following is a specification.

This invention relates to internal combustion engines for use on aircraft and has for its object to effect certain improvements in the operation and control of the engine in order to compensate for the effects caused in the working of the engine by the variations in the density of the air.

In the design of aero engines intended primarily for work at high altitudes there is at present a tendency to employ large cylinders which are not used at their full capacity on the ground the available capacity being reduced by throttling which is controlled either by barometric pressure or by hand. The alternative to this system appears to be the employment of supercharging. In so far as the bearings are concerned it may be accepted that the loading upon them is a function of the inertia forces and of the reciprocating and centrifugal force of the revolving masses. The actual fluid pressure has no direct bearing on the case and indeed it can be shown that at speeds which are now commonly employed the minimum loading on the connecting rod big end bearing occurs when the fluid pressure is at its maximum. Of course the fluid pressure has the indirect bearing that if the working parts can be safely relieved of high maximum pressures they can be made correspondingly lighter and therefore the loading due to inertia and the other forces indicated can be reduced but this is true only if the working parts can be insured absolutely against being subjected to the full pressures under circumstances however abnormal. It is doubtful whether the reduction of pressure by throttling is the best or safest means to adopt. In the first place it is clear that the reduction of pressure is dependent upon the speed of the engine and that the pressure will rise rapidly for a given throttle opening if the speed is reduced, and this will tend to produce the worst possible condition for the working parts of the engine since these parts will then be subjected to the highest pressures at a time when the relieving inertia pressure is at a minimum. Such a condition may not normally arise when the engine is coupled to a propeller but in the event of one or more cylinders misfiring from any cause the engine speed will fall the quantity of the charge taken in will be increased and the working parts will be subjected to a considerable increase of pressure at a time when the turning moment has become irregular and the engine is already severely stressed. The present invention provides a means of overcoming these disadvantages.

According to this invention the engine is so constructed that the time of closing the inlet valve or valves is variable and is determined by the varying density of the air. Thus the engine has a variable capacity which is reduced at low altitudes by late closing of the inlet valve or valves while at high altitudes the capacity is increased by earlier closing of the valve or valves and this variation may be effected automatically in accordance with the variations in the density of the air for example by means of some suitable barometric device. The inlet valve or each of them if more than one is provided, is preferably constructed and operated to give a quick cut-off and the valve-operating mechanism is constructed and arranged to enable the inlet valve or valves to be closed at a time which is variable between the normal and later than the normal. For example this valve operating mechanism may comprise a cam having an operative periphery of varying or variable length the construction and arrangement being such that the cam can be set while the engine is running in order to vary its action on the inlet valve or valves and the time of closing this valve or valves. The means by which this setting of the cam and the consequent variation in the timing of the valve or valves is effected may be automatic and actuated by the fluctuations in the air density.

By means of this invention it becomes possible to employ with safety a high expansion ratio as a result of which the fuel consumption at any altitude will be greatly reduced while in the event of one or more cylinders misfiring the pressure in the other cylinders will fall slightly. If for example an expansion ratio of 7.1 is employed and the full cylinder capacity is used the brake mean pressure at 20,000 feet altitude will be approximately 70 lbs. per square inch while when working at the ground level and using rather more than half the stroke volume the mean brake pressure will be approximately 90 lbs. per square inch. The maximum pressure at any altitude up to 20,000 feet will not exceed 300 lbs. per square inch.

When running on the ground level a full charge of mixture is drawn into the cylinder but as the valve operating mechanism is then set so that the inlet valve will close late for example at about 50% of the stroke, nearly half of this full charge will be returned into the induction manifold. Incidentally this will make use of some of the latent heat of the fuel for cooling the cylinder internally while at the same time the induction pipe will be warmed which will tend to prevent precipitation of the fuel on its walls. If, when on the ground, the inlet is closed at half stroke the pressure in the cylinder at that moment will depend upon the speed of the engine and the rate of closing of the inlet valve and this rate and the maximum pressure will drop slightly with reduction in the engine speed since the actual point at which compression of the charge commences is dependent not only upon the time of closing of the inlet valve but also on the velocity through this valve. The loading on the working parts however will remain nearly constant at any speed since the slight drop in the maximum pressure will compensate for the corresponding drop in the inertia forces at lower speeds. As the aircraft rises the closing of the inlet valves is advanced so that more and more of the full charge drawn into the cylinder at each stroke is utilized until the engine is working at its full cylinder capacity.

The details of construction may be varied in accordance with requirements and the type of engine to which the invention is applied. Various constructions of valve operating mechanism may be employed to enable the variations in the time of closing the valves to be effected in the desired manner. For example, a device may be used which comprises a cam of suitable formation mounted on a shaft adapted to slide in the direction of its axis so that different portions of the width of the cam face having different peripheral lengths can become operative on the valve rod. The mechanism employed to effect the variations in the setting or face formation of the cam may be as found convenient and suitable for actuation by the type of barometric controlling device employed. The construction of this controlling device may be of any suitable type. In order to obtain a rapid cut-off as is preferable it is convenient to use inlet valves and port constructions for example of a known type in which the valve seat is sunk or disposed at the bottom of a cylindrical recess into which the valve enters as it is returning to its seat and causes the cut-off to occur before the valve is seated. With such an arrangement of masked port the valve may still have a rapid movement at the moment when the cut-off takes place. The details of the construction and arrangement of such valves may vary as found desirable.

The accompanying drawings illustrate by way of example one construction that may be adopted in putting the present invention into practice. In these drawings, Figure 1 is a somewhat diagrammatic sectional elevation showing the essential parts of the apparatus namely the inlet valve of an internal combustion engine, the adjustable cam shaft and a barometric device by means of which the adjustment in the cam shaft is effected.

Fig. 2 is a transverse section through the cam shaft on the line 2—2 of Fig. 1 illustrating the formation of the cam.

Fig. 3 shows indicator diagrams illustrative of the variations in the cylinder capacity which result from the automatic alterations in the time of closing the inlet valve.

In order to obtain rapid opening and closing of the inlet valve A this is preferably constructed of a known type with a cylindrical portion A' formed about its lip so as to engage and closely fit a cylindrical recess B at the bottom of which is situated the valve seat B'. Thus the port is actually closed by the valve while the latter is still moving and before it reaches its seat and similarly the valve will have been lifted off its seat and its movement appreciably accelerated before the port is opened.

The lifting of the valve is performed by a cam C mounted on a cam shaft D so constructed and arranged that it can be moved in the axial direction while it is being rotated. The cam is given additional breadth in the direction of its axis and toward one end the operative part C is of substantially the usual dimensions so that it will act on the roller E carried on the end of the valve spindle E' for such a length of time as will only cause the valve A to be lifted off its seat and the port opened and closed at the usual points in the piston stroke. The peripheral length of the operative portion C of the cam is increased toward the other end as at C' (Fig. 2) so that if the cam shaft D is moved in the axial direction sufficiently to bring this part C' into position to act on the valve spindle roller E the timing of the valve A will be altered so that the valve will close the port later. The variation in the peripheral length of the operative part of the cam is gradual between the extremes of the parts C and C' so that correspondingly gradual variation in the time of closing the valve can be effected as the cam shaft D is moved in the axial direction.

The longitudinal movement of the cam shaft D is brought about automatically by variations in the density of the atmosphere. A convenient mechanism whereby this action may be caused comprises a barometric device such for example as a closed chamber F provided with a flexible wall or diaphragm F' the air being exhausted from the interior of this chamber so that variations in the density of the atmosphere will bring about corresponding movements of the diaphragm. This diaphragm is connected by a pivoted link G with one arm H of a bell-crank lever pivoted at H' the other arm H² of this lever being forked and connected to a collar J loosely mounted on the end of the cam shaft D between flanges D' and D². A spring K is coiled around the end of the cam shaft D one end of this spring bearing against the casing L through which passes the end of the cam shaft while the other end of the spring bears against the collar J. The spring K tends to move the cam shaft D longitudinally in that direction which will bring the longer peripheral portion D' of the cam into operation on the valve spindle.

When an aircraft having the engine fitted with the above described device is at the ground level the atmospheric pressure so acts on the diaphragm F' as to allow the cam shaft to be moved in the axial direction by the spring K'. As a result the portion C' of the cam is in operation and the closing of the inlet port by the valve A is delayed. As, however the aircraft rises from the ground and the decrease in the air pressure on the spring diaphragm F' causes the cam shaft D to be moved longitudinally against the action of the spring K and the closing of the inlet port is advanced more and more until the part C of the cam comes into operation.

The superimposed indicator diagrams in Fig. 3 illustrate the variations in the cylinder capacity which result from thus altering the time of the closing of the inlet port. The diagram M drawn in full lines is that obtained when the closing of the inlet port is delayed by longitudinal movement of the cam shaft D so as to bring the part C' of the cam into operation on the valve spindle. The valve has then been held up so as to prevent the port being closed until the point M' which as will be seen corresponds to when the piston has performed nearly 50% of the compression stroke. The diagram N drawn in dotted lines shows the result of closing the port somewhat earlier at the point N' the cam shaft D having then been moved in the axial direction so as to make operative on the valve that part of the cam which lies about midway between the extreme parts C and C'. Finally the normal diagram O drawn in chain lines shows the effect obtained when the cam shaft D has been moved still farther so as to bring into operation the part C of the cam the inlet port then being closed at the point O', that is to say, practically at the commencement of the compression stroke of the piston.

What I claim as my invention and desire to secure by Letters Patent is:—

1. In an internal combustion engine the combination of an inlet valve, mechanism for operating this valve, means for adjusting the operating mechanism so as to vary the time of closing the inlet valve, and means for controlling the adjusting means in accordance with variations in the density of the atmosphere as set forth.

2. In an internal combustion engine the combination of an inlet valve, a rotatable cam which operates this valve, means for adjusting this cam so as to vary its action on the valve and the time of closing the latter, and means for controlling the adjusting means in accordance with variations in the density of the atmosphere as set forth.

3. In an internal combustion engine the combination of an inlet valve, a rotatable cam which operates this valve and is so formed that by adjustment thereof the length of the operative face of the cam can be varied so as to vary its action on the valve and the time of closing the latter, means for adjusting the cam, and means for controlling the adjusting means in accordance with variations in the density of the atmosphere as set forth.

4. In an internal combustion engine the combination of an inlet valve, a member adapted to be acted on by a cam and serving to operate the valve, a rotatable cam so formed and adjustable as to enable the length of its face which acts on the valve operating member to be varied for the purpose of varying the time of closing the inlet valve, mechanism for adjusting the cam, and means for controlling the cam adjusting mechanism in accordance with variations in the density of the atmosphere as set forth.

5. In an internal combustion engine the combination of an inlet valve, a rotatable cam which operates this valve and is so formed that by adjustment thereof in the direction of its axis the length of the operative face of the cam can be varied so as to vary its action on the valve and the time of closing the latter, means for adjusting the cam in the direction of its axis, and means for controlling the adjusting means in accordance with variations in the density of the atmosphere as set forth.

6. In an internal combustion engine the combination of an inlet valve, a rotatable cam which operates this valve and has a wide face the circumferential operative length of which varies at different points in its width, means for adjusting this cam so as to bring into operation on the valve, parts of the cam face which have different operative lengths, and means for controlling the cam adjusting means in accordance with variations in the density of the atmosphere as set forth.

7. In an internal combustion engine the combination of an inlet valve, a member adapted to be acted on by a cam and serving to operate the valve, a rotatable cam so formed and adjustable in the direction of its axis as to enable the length of its face which acts on the valve operating member to be varied for the purpose of varying the time of closing the inlet valve, mechanism for adjusting the cam in the direction of its axis, and a device sensitive to variations in the density of the atmosphere and operative to control the cam adjusting mechanism as set forth.

8. In an internal combustion engine the combination of an inlet valve, a rotatable cam which operates this valve and has a wide face the circumferential operative length of which varies at different points in its width the cam being mounted so as to be adjustable in the direction of its axis, mechanism for adjusting this cam in the direction of its axis so as to bring into operation on the valve parts of the cam face which have different operative lengths, and a device sensitive to variations in the density of the atmosphere and operative to control the cam adjusting mechanism as set forth.

9. In an internal combustion engine the combination of an inlet valve a member adapted to be acted on by a cam and serving to operate the valve, a cam mounted on a rotatable shaft which is capable of movement in the direction of its axis the cam being so formed that the length of its face which acts on the valve operating member can be varied by movement of the cam shaft in the axial direction so as to vary the time of closing the inlet valve, mechanism for imparting movement to the cam shaft in the direction of its axis, and a device sensitive to variations in the density of the atmosphere and operative to control the mechanism which moves the cam shaft as set forth.

10. In an internal combustion engine the combination of an inlet valve, mechanism for operating this valve, means for adjusting the operating mechanism so as to vary the time of closing the inlet valve, and a device having a part which moves as a result of changes in the density of the atmosphere the movement of this part being operative to control the adjusting means as set forth.

11. In an internal combustion engine the combination of an inlet valve, a member adapted to be acted on by a cam and serving to operate the valve, a rotatable shaft mounted so as to be movable in the direction of its axis, a spring tending to move this shaft axially in one direction, mechanism by means of which the shaft can be moved axially in the opposite direction against the action of the spring, a device having a part which moves as a result of changes in the density of the atmosphere this movable part being coupled to the mechanism by means of which the cam shaft is moved axially, and a cam mounted on the shaft and so formed that the length of its face which acts on the valve operating member can be varied when the cam shaft is moved in the axial direction so as to vary the time of closing the inlet valve as set forth.

12. In an internal combustion engine the combination of an inlet valve, a member adapted to be acted on by a cam and serving to operate the valve, a rotatable shaft mounted so as to be movable in the direction of its axis, a spring tending to move this shaft axially in one direction, mechanism by means of which the shaft can be moved axially in the opposite direction against the action of the spring, a device having a part which moves as a result of changes in the density of the atmosphere this movable part being coupled to the mechanism by means of which the cam shaft is moved axially, and a cam which is mounted on the shaft and has a wide face the circumferential operative length of which varies at different points in its width so that as the shaft is moved in the axial direction parts of the cam face which have different operative widths are successively positioned for acting on the valve operating member and the time of closing the inlet valve will thereby be varied as set forth.

In testimony whereof I have signed my name to this specification in the presence of two subscribing witnesses.

HARRY RALPH RICARDO.

Witnesses:
A. J. HALL,
R. BAGCOTT.